(12) United States Patent
Graham

(10) Patent No.: US 11,922,237 B1
(45) Date of Patent: Mar. 5, 2024

(54) SINGLE-STEP COLLECTIVE OPERATIONS

(71) Applicant: Mellanox Technologies, Ltd., Yokneam (IL)

(72) Inventor: Richard Graham, Knoxville, TN (US)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 18/105,846

(22) Filed: Feb. 5, 2023

Related U.S. Application Data

(60) Provisional application No. 63/405,505, filed on Sep. 12, 2022.

(51) Int. Cl.
*G06F 9/54* (2006.01)
(52) U.S. Cl.
CPC .................... *G06F 9/546* (2013.01)
(58) Field of Classification Search
CPC ....................................................... G06F 9/546
See application file for complete search history.

(56) References Cited

U.S. PATENT DOCUMENTS

| | | | |
|---|---|---|---|
| 4,933,969 A | 6/1990 | Marshall et al. |
| 5,068,877 A | 11/1991 | Near et al. |
| 5,325,500 A | 6/1994 | Bell et al. |
| 5,353,412 A | 10/1994 | Douglas et al. |
| 5,404,565 A | 4/1995 | Gould et al. |
| 5,408,469 A | 4/1995 | Opher et al. |
| 5,606,703 A | 2/1997 | Brady et al. |
| 5,944,779 A | 8/1999 | Blum |
| 6,041,049 A | 3/2000 | Brady |
| 6,115,394 A | 9/2000 | Balachandran et al. |
| 6,212,197 B1 | 4/2001 | Christensen et al. |
| 6,370,502 B1 | 4/2002 | Wu et al. |
| 6,438,137 B1 | 8/2002 | Turner et al. |

(Continued)

FOREIGN PATENT DOCUMENTS

AU     2012216611 B2     3/2013

OTHER PUBLICATIONS

Mellanox Technologies, "InfiniScale IV: 36-port 40GB/s Infiniband Switch Device", pp. 1-2, year 2009.

(Continued)

*Primary Examiner* — Bryan Y Lee
(74) *Attorney, Agent, or Firm* — Kligler & Associates Patent Attorneys Ltd.

(57) ABSTRACT

A method for collective communications includes invoking a collective operation over a group of computing processes in which the processes concurrently transmit and receive data to and from other processes in the group via a communication medium. Messages are composed for transmission by source processes including metadata indicating how the data to be transmitted by the source processes in the collective operation are to be handled by destination processes that are to receive the data and also including in at least some of the messages the data to be transmitted by one or more of the source processes to one or more of the destination processes. The composed messages are transmitted concurrently from the source processes to the destination processes in the group over the communication medium. The data are processed by the destination processes in response to the metadata included in the messages received by the destination processes.

15 Claims, 3 Drawing Sheets

(56) References Cited

U.S. PATENT DOCUMENTS

| | | |
|---|---|---|
| 6,483,804 B1 | 11/2002 | Muller et al. |
| 6,507,562 B1 | 1/2003 | Kadansky et al. |
| 6,728,862 B1 | 4/2004 | Wilson |
| 6,816,492 B1 | 11/2004 | Turner et al. |
| 6,857,004 B1 | 2/2005 | Howard et al. |
| 6,937,576 B1 | 8/2005 | Di Benedetto et al. |
| 7,102,998 B1 | 9/2006 | Golestani |
| 7,124,180 B1 | 10/2006 | Ranous |
| 7,164,422 B1 | 1/2007 | Wholey, III et al. |
| 7,171,484 B1 | 1/2007 | Krause et al. |
| 7,224,669 B2 | 5/2007 | Kagan et al. |
| 7,245,627 B2 | 7/2007 | Goldenberg et al. |
| 7,313,582 B2 | 12/2007 | Bhanot et al. |
| 7,327,693 B1 | 2/2008 | Rivers et al. |
| 7,336,646 B2 | 2/2008 | Muller |
| 7,346,698 B2 | 3/2008 | Hannaway |
| 7,555,549 B1 | 6/2009 | Campbell et al. |
| 7,613,774 B1 | 11/2009 | Caronni et al. |
| 7,636,424 B1 | 12/2009 | Halikhedkar et al. |
| 7,636,699 B2 | 12/2009 | Stanfill |
| 7,676,597 B2 | 3/2010 | Kagan et al. |
| 7,738,443 B2 | 6/2010 | Kumar |
| 7,760,743 B2 | 7/2010 | Shokri et al. |
| 8,213,315 B2 | 7/2012 | Crupnicoff et al. |
| 8,255,475 B2 | 8/2012 | Kagan et al. |
| 8,370,675 B2 | 2/2013 | Kagan |
| 8,380,880 B2 | 2/2013 | Gulley et al. |
| 8,510,366 B1 | 8/2013 | Anderson et al. |
| 8,645,663 B2 | 2/2014 | Kagan et al. |
| 8,738,891 B1 | 5/2014 | Karandikar et al. |
| 8,761,189 B2 | 6/2014 | Shachar et al. |
| 8,768,898 B1 | 7/2014 | Trimmer et al. |
| 8,775,698 B2 | 7/2014 | Archer et al. |
| 8,811,417 B2 | 8/2014 | Bloch et al. |
| 9,110,860 B2 | 8/2015 | Shahar |
| 9,189,447 B2 | 11/2015 | Faraj |
| 9,294,551 B1 | 3/2016 | Froese et al. |
| 9,344,490 B2 | 5/2016 | Bloch et al. |
| 9,397,960 B2 | 7/2016 | Arad et al. |
| 9,456,060 B2 | 9/2016 | Pope et al. |
| 9,563,426 B1 | 2/2017 | Bent et al. |
| 9,626,329 B2 | 4/2017 | Howard |
| 9,756,154 B1 | 9/2017 | Jiang |
| 10,015,106 B1 | 7/2018 | Florissi et al. |
| 10,027,601 B2 | 7/2018 | Narkis et al. |
| 10,158,702 B2 | 12/2018 | Bloch et al. |
| 10,187,400 B1 | 1/2019 | Castro et al. |
| 10,284,383 B2 | 5/2019 | Bloch et al. |
| 10,296,351 B1 | 5/2019 | Kohn et al. |
| 10,305,980 B1 | 5/2019 | Gonzalez et al. |
| 10,318,306 B1 | 6/2019 | Kohn et al. |
| 10,320,508 B2 | 6/2019 | Shimizu et al. |
| 10,425,350 B1 | 9/2019 | Florissi |
| 10,515,045 B1 | 12/2019 | Mattina |
| 10,521,283 B2 | 12/2019 | Shuler et al. |
| 10,528,518 B2 | 1/2020 | Graham et al. |
| 10,541,938 B1 | 1/2020 | Timmerman et al. |
| 10,547,553 B2 | 1/2020 | Shattah et al. |
| 10,621,489 B2 | 4/2020 | Appuswamy et al. |
| 10,727,966 B1 | 7/2020 | Izenberg et al. |
| 11,088,971 B2 | 8/2021 | Brody et al. |
| 11,336,383 B2 | 5/2022 | Mula et al. |
| 11,388,263 B2 | 7/2022 | Levi et al. |
| 2002/0010844 A1 | 1/2002 | Noel et al. |
| 2002/0035625 A1 | 3/2002 | Tanaka |
| 2002/0150094 A1 | 10/2002 | Cheng et al. |
| 2002/0150106 A1 | 10/2002 | Kagan et al. |
| 2002/0152315 A1 | 10/2002 | Kagan et al. |
| 2002/0152327 A1 | 10/2002 | Kagan et al. |
| 2002/0152328 A1 | 10/2002 | Kagan et al. |
| 2002/0165897 A1 | 11/2002 | Kagan et al. |
| 2003/0002483 A1 | 1/2003 | Zwack |
| 2003/0018828 A1 | 1/2003 | Craddock et al. |
| 2003/0061417 A1 | 3/2003 | Craddock et al. |
| 2003/0065856 A1 | 4/2003 | Kagan et al. |
| 2003/0120835 A1 | 6/2003 | Kale et al. |
| 2004/0030745 A1 | 2/2004 | Boucher et al. |
| 2004/0062258 A1 | 4/2004 | Grow et al. |
| 2004/0078493 A1 | 4/2004 | Blumrich et al. |
| 2004/0120331 A1 | 6/2004 | Rhine et al. |
| 2004/0123071 A1 | 6/2004 | Stefan et al. |
| 2004/0174820 A1 | 9/2004 | Ricciulli |
| 2004/0252685 A1 | 12/2004 | Kagan et al. |
| 2004/0260683 A1 | 12/2004 | Chan et al. |
| 2005/0097300 A1 | 5/2005 | Gildea et al. |
| 2005/0122329 A1 | 6/2005 | Janus |
| 2005/0129039 A1 | 6/2005 | Biran et al. |
| 2005/0131865 A1 | 6/2005 | Jones et al. |
| 2005/0223118 A1 | 10/2005 | Tucker et al. |
| 2005/0281287 A1 | 12/2005 | Ninomi et al. |
| 2006/0095610 A1 | 5/2006 | Arndt et al. |
| 2006/0282838 A1 | 12/2006 | Gupta et al. |
| 2007/0127396 A1 | 6/2007 | Jain et al. |
| 2007/0127525 A1 | 6/2007 | Sarangam et al. |
| 2007/0162236 A1 | 7/2007 | Lamblin et al. |
| 2008/0040792 A1 | 2/2008 | Larson et al. |
| 2008/0104218 A1 | 5/2008 | Liang et al. |
| 2008/0126564 A1 | 5/2008 | Wilkinson |
| 2008/0168471 A1 | 7/2008 | Benner et al. |
| 2008/0181260 A1 | 7/2008 | Vonog et al. |
| 2008/0192750 A1 | 8/2008 | Ko et al. |
| 2008/0219159 A1 | 9/2008 | Chateau et al. |
| 2008/0244220 A1 | 10/2008 | Lin et al. |
| 2008/0263329 A1 | 10/2008 | Archer et al. |
| 2008/0288949 A1 | 11/2008 | Bohra et al. |
| 2008/0298380 A1 | 12/2008 | Rittmeyer et al. |
| 2008/0307082 A1 | 12/2008 | Cai et al. |
| 2009/0037377 A1 | 2/2009 | Archer et al. |
| 2009/0063816 A1 | 3/2009 | Arimilli et al. |
| 2009/0063817 A1 | 3/2009 | Arimilli et al. |
| 2009/0063891 A1 | 3/2009 | Arimilli et al. |
| 2009/0182814 A1 | 7/2009 | Tapolcai et al. |
| 2009/0240838 A1 | 9/2009 | Berg et al. |
| 2009/0247241 A1 | 10/2009 | Gollnick et al. |
| 2009/0292905 A1 | 11/2009 | Faraj |
| 2009/0296699 A1 | 12/2009 | Hefty |
| 2009/0327444 A1 | 12/2009 | Archer et al. |
| 2010/0017420 A1 | 1/2010 | Archer et al. |
| 2010/0049836 A1 | 2/2010 | Kramer |
| 2010/0074098 A1 | 3/2010 | Zeng et al. |
| 2010/0095086 A1 | 4/2010 | Eichenberger et al. |
| 2010/0185719 A1 | 7/2010 | Howard |
| 2010/0241828 A1 | 9/2010 | Yu et al. |
| 2010/0274876 A1 | 10/2010 | Kagan et al. |
| 2010/0329275 A1 | 12/2010 | Johnsen et al. |
| 2011/0060891 A1 | 3/2011 | Jia |
| 2011/0066649 A1 | 3/2011 | Berlyant et al. |
| 2011/0093258 A1 | 4/2011 | Xu et al. |
| 2011/0119673 A1 | 5/2011 | Bloch et al. |
| 2011/0173413 A1 | 7/2011 | Chen et al. |
| 2011/0219208 A1 | 9/2011 | Asaad |
| 2011/0238956 A1 | 9/2011 | Arimilli et al. |
| 2011/0258245 A1 | 10/2011 | Blocksome et al. |
| 2011/0276789 A1 | 11/2011 | Chambers et al. |
| 2012/0063436 A1 | 3/2012 | Thubert et al. |
| 2012/0117331 A1 | 5/2012 | Krause et al. |
| 2012/0131309 A1 | 5/2012 | Johnson |
| 2012/0254110 A1 | 10/2012 | Takemoto |
| 2013/0117548 A1 | 5/2013 | Grover et al. |
| 2013/0159410 A1 | 6/2013 | Lee et al. |
| 2013/0159568 A1 | 6/2013 | Shahar et al. |
| 2013/0215904 A1 | 8/2013 | Zhou et al. |
| 2013/0250756 A1 | 9/2013 | Johri et al. |
| 2013/0312011 A1 | 11/2013 | Kumar et al. |
| 2013/0318525 A1 | 11/2013 | Palanisamy et al. |
| 2013/0336292 A1 | 12/2013 | Kore et al. |
| 2014/0019574 A1 | 1/2014 | Cardona et al. |
| 2014/0033217 A1 | 1/2014 | Vajda et al. |
| 2014/0040542 A1 | 2/2014 | Kim et al. |
| 2014/0047341 A1 | 2/2014 | Breternitz et al. |
| 2014/0095779 A1 | 4/2014 | Forsyth et al. |
| 2014/0122831 A1 | 5/2014 | Uliel et al. |
| 2014/0136811 A1 | 5/2014 | Fleischer et al. |
| 2014/0189308 A1 | 7/2014 | Hughes et al. |

(56) References Cited

U.S. PATENT DOCUMENTS

| | | |
|---|---|---|
| 2014/0211804 A1 | 7/2014 | Makikeni et al. |
| 2014/0258438 A1 | 9/2014 | Ayoub |
| 2014/0280420 A1 | 9/2014 | Khan |
| 2014/0281370 A1 | 9/2014 | Khan |
| 2014/0362692 A1 | 12/2014 | Wu et al. |
| 2014/0365548 A1 | 12/2014 | Mortensen |
| 2014/0379714 A1 | 12/2014 | Hankins |
| 2015/0046741 A1 | 2/2015 | Yen et al. |
| 2015/0055508 A1 | 2/2015 | Ashida et al. |
| 2015/0074373 A1 | 3/2015 | Sperber et al. |
| 2015/0106578 A1 | 4/2015 | Warfield et al. |
| 2015/0143076 A1 | 5/2015 | Khan |
| 2015/0143077 A1 | 5/2015 | Khan |
| 2015/0143078 A1 | 5/2015 | Khan et al. |
| 2015/0143079 A1 | 5/2015 | Khan |
| 2015/0143085 A1 | 5/2015 | Khan |
| 2015/0143086 A1 | 5/2015 | Khan |
| 2015/0154058 A1 | 6/2015 | Miwa et al. |
| 2015/0178211 A1 | 6/2015 | Hiramoto et al. |
| 2015/0180785 A1 | 6/2015 | Annamraju |
| 2015/0188987 A1 | 7/2015 | Reed et al. |
| 2015/0193271 A1 | 7/2015 | Archer et al. |
| 2015/0212972 A1 | 7/2015 | Boettcher et al. |
| 2015/0261720 A1 | 9/2015 | Kagan et al. |
| 2015/0269116 A1 | 9/2015 | Raikin et al. |
| 2015/0278347 A1 | 10/2015 | Meyer et al. |
| 2015/0318015 A1 | 11/2015 | Bose et al. |
| 2015/0347012 A1 | 12/2015 | Dewitt et al. |
| 2015/0365494 A1 | 12/2015 | Cardona et al. |
| 2015/0379022 A1 | 12/2015 | Puig et al. |
| 2016/0055225 A1 | 2/2016 | Xu et al. |
| 2016/0092362 A1 | 3/2016 | Barron et al. |
| 2016/0105494 A1 | 4/2016 | Reed et al. |
| 2016/0112531 A1 | 4/2016 | Milton et al. |
| 2016/0117277 A1 | 4/2016 | Raindel et al. |
| 2016/0119244 A1 | 4/2016 | Wang et al. |
| 2016/0179537 A1 | 6/2016 | Kunzman et al. |
| 2016/0219009 A1 | 7/2016 | French |
| 2016/0246646 A1 | 8/2016 | Craciunas et al. |
| 2016/0248656 A1 | 8/2016 | Anand et al. |
| 2016/0283422 A1 | 9/2016 | Crupnicoff et al. |
| 2016/0294793 A1 | 10/2016 | Larson et al. |
| 2016/0299872 A1 | 10/2016 | Vaidyanathan et al. |
| 2016/0342568 A1 | 11/2016 | Burchard et al. |
| 2016/0352598 A1 | 12/2016 | Reinhardt et al. |
| 2016/0364350 A1 | 12/2016 | Sanghi et al. |
| 2017/0063613 A1 | 3/2017 | Bloch et al. |
| 2017/0093715 A1 | 3/2017 | McGhee et al. |
| 2017/0116154 A1 | 4/2017 | Palmer et al. |
| 2017/0187496 A1 | 6/2017 | Shalev et al. |
| 2017/0187589 A1 | 6/2017 | Pope et al. |
| 2017/0187629 A1 | 6/2017 | Shalev et al. |
| 2017/0187846 A1 | 6/2017 | Shalev et al. |
| 2017/0192970 A1 | 7/2017 | Valentine et al. |
| 2017/0199844 A1 | 7/2017 | Burchard et al. |
| 2017/0262517 A1 | 9/2017 | Horowitz et al. |
| 2017/0308329 A1 | 10/2017 | A et al. |
| 2017/0331926 A1 | 11/2017 | Raveh et al. |
| 2017/0344589 A1 | 11/2017 | Kafai et al. |
| 2018/0004530 A1 | 1/2018 | Vorbach |
| 2018/0046901 A1 | 2/2018 | Xie et al. |
| 2018/0047099 A1 | 2/2018 | Bonig et al. |
| 2018/0089278 A1 | 3/2018 | Bhattacharjee et al. |
| 2018/0091442 A1 | 3/2018 | Chen et al. |
| 2018/0097721 A1 | 4/2018 | Matsui et al. |
| 2018/0115529 A1 | 4/2018 | Munger et al. |
| 2018/0173673 A1 | 6/2018 | Daglis et al. |
| 2018/0262551 A1 | 9/2018 | Demeyer et al. |
| 2018/0278549 A1 | 9/2018 | Mula et al. |
| 2018/0285316 A1 | 10/2018 | Thorson et al. |
| 2018/0287928 A1 | 10/2018 | Levi et al. |
| 2018/0302324 A1 | 10/2018 | Kasuya |
| 2018/0321912 A1 | 11/2018 | Li et al. |
| 2018/0321938 A1 | 11/2018 | Boswell et al. |
| 2018/0349212 A1 | 12/2018 | Liu et al. |
| 2018/0367465 A1 | 12/2018 | Levi |
| 2018/0375781 A1 | 12/2018 | Chen et al. |
| 2019/0018805 A1 | 1/2019 | Benisty |
| 2019/0026250 A1 | 1/2019 | Das Sarma et al. |
| 2019/0044827 A1* | 2/2019 | Ganapathi ........... H04L 41/0806 |
| 2019/0044875 A1* | 2/2019 | Murty .................... H04L 45/24 |
| 2019/0044889 A1 | 2/2019 | Serres et al. |
| 2019/0056972 A1 | 2/2019 | Zhou et al. |
| 2019/0065208 A1 | 2/2019 | Liu et al. |
| 2019/0068501 A1 | 2/2019 | Schneder et al. |
| 2019/0102179 A1 | 4/2019 | Fleming et al. |
| 2019/0102338 A1 | 4/2019 | Tang et al. |
| 2019/0102640 A1 | 4/2019 | Balasubramanian |
| 2019/0114533 A1 | 4/2019 | Ng et al. |
| 2019/0121388 A1 | 4/2019 | Knowles et al. |
| 2019/0124524 A1 | 4/2019 | Gormley |
| 2019/0138638 A1 | 5/2019 | Pal et al. |
| 2019/0141133 A1 | 5/2019 | Rajan et al. |
| 2019/0147092 A1 | 5/2019 | Pal et al. |
| 2019/0149486 A1 | 5/2019 | Bohrer et al. |
| 2019/0149488 A1 | 5/2019 | Bansal et al. |
| 2019/0171612 A1 | 6/2019 | Shahar et al. |
| 2019/0235866 A1 | 8/2019 | Das Sarma et al. |
| 2019/0278737 A1 | 9/2019 | Kozomora et al. |
| 2019/0303168 A1 | 10/2019 | Fleming, Jr. et al. |
| 2019/0303263 A1 | 10/2019 | Fleming, Jr. et al. |
| 2019/0319730 A1 | 10/2019 | Webb et al. |
| 2019/0324431 A1 | 10/2019 | Cella et al. |
| 2019/0339688 A1 | 11/2019 | Cella et al. |
| 2019/0347099 A1 | 11/2019 | Eapen et al. |
| 2019/0369994 A1 | 12/2019 | Parandeh Afshar et al. |
| 2019/0377580 A1 | 12/2019 | Vorbach |
| 2019/0379714 A1 | 12/2019 | Levi et al. |
| 2020/0005859 A1 | 1/2020 | Chen et al. |
| 2020/0034145 A1 | 1/2020 | Bainville et al. |
| 2020/0057748 A1 | 2/2020 | Danilak |
| 2020/0103894 A1 | 4/2020 | Cella et al. |
| 2020/0106828 A1 | 4/2020 | Elias et al. |
| 2020/0137013 A1 | 4/2020 | Jin et al. |
| 2020/0202246 A1 | 6/2020 | Lin et al. |
| 2020/0265043 A1 | 8/2020 | Graham et al. |
| 2020/0274733 A1 | 8/2020 | Graham et al. |
| 2021/0203621 A1 | 7/2021 | Ylisirnio et al. |
| 2021/0218808 A1* | 7/2021 | Graham ................ H04L 67/566 |
| 2021/0234753 A1 | 7/2021 | Ben-Moshe et al. |
| 2021/0243140 A1 | 8/2021 | Levi et al. |
| 2021/0297151 A1 | 9/2021 | Levi et al. |
| 2022/0006606 A1 | 1/2022 | Levi et al. |
| 2022/0029854 A1 | 1/2022 | Graham et al. |
| 2022/0188147 A1 | 6/2022 | Nudelman et al. |
| 2022/0201103 A1* | 6/2022 | Keppel ............... H04L 49/9068 |

OTHER PUBLICATIONS

Mellanox Technologies Inc., "Scaling 10Gb/s Clustering at Wire-Speed", pp. 1-8, year 2006.

IEEE 802.1D Standard "IEEE Standard for Local and Metropolitan Area Networks—Media Access Control (MAC) Bridges", IEEE Computer Society, pp. 1-281, Jun. 9, 2004.

IEEE 802.1AX Standard "IEEE Standard for Local and Metropolitan Area Networks—Link Aggregation", IEEE Computer Society, pp. 1-163, Nov. 3, 2008.

Turner et al., "Multirate Clos Networks", IEEE Communications Magazine, pp. 1-11, Oct. 2003.

Thayer School of Engineering, "An Slightly Edited Local Copy of Elements of Lectures 4 and 5", Dartmouth College, pp. 1-5, Jan. 15, 1998 http://people.seas.harvard.edu/~jones/cscie129/nu_lectures/lecture11/switching/clos_network/clos_network.html.

"MPI: A Message-Passing Interface Standard," Message Passing Interface Forum, version 3.1, pp. 1-868, Jun. 4, 2015.

Coti et al., "MPI Applications on Grids: a Topology Aware Approach," Proceedings of the 15th International European Conference on Parallel and Distributed Computing (EuroPar'09), pp. 1-12, Aug. 2009.

Petrini et al., "The Quadrics Network (QsNet): High-Performance Clustering Technology," Proceedings of the 9th IEEE Symposium on Hot Interconnects (Hotl'01), pp. 1-6, Aug. 2001.

(56) References Cited

OTHER PUBLICATIONS

Sancho et al., "Efficient Offloading of Collective Communications in Large-Scale Systems," Proceedings of the 2007 IEEE International Conference on Cluster Computing, pp. 1-10, Sep. 17-20, 2007.

Priest et al., "You've Got Mail (YGM): Building Missing Asynchronous Communication Primitives", IEEE International Parallel and Distributed Processing Symposium Workshops, pp. 221-230, year 2019.

InfiniBand Architecture Specification, vol. 1, Release 1.2.1, pp. 1-1727, Nov. 2007.

Deming, "Infiniband Architectural Overview", Storage Developer Conference, pp. 1-70, year 2013.

Fugger et al., "Reconciling fault-tolerant distributed computing and systems-on-chip", Distributed Computing, vol. 24, Issue 6, pp. 323-355, Jan. 2012.

Wikipedia, "System on a chip", pp. 1-4, Jul. 6, 2018.

Villavieja et al., "On-chip Distributed Shared Memory", Computer Architecture Department, pp. 1-10, Feb. 3, 2011.

Wikipedia, "Nagle's algorithm", pp. 1-4, Dec. 12, 2019.

Bruck et al., "Efficient Algorithms for All-to-All Communications in Multiport Message-Passing Systems", IEEE Transactions on Parallel and Distributed Systems, vol. 8, No. 11, pp. 1143-1156, Nov. 1997.

Gainaru et al., "Using InfiniBand Hardware Gather-Scatter Capabilities to Optimize MPI All-to-All", EuroMPI '16, Edinburgh, United Kingdom, pp. 1-13, year 2016.

Pjesivac-Grbovic et al., "Performance analysis of MPI collective operations", Cluster Computing, pp. 1-25, 2007.

Bruck et al., "Efficient Algorithms for All-to-All Communications in Multiport Message-Passing Systems", Proceedings of the sixth annual ACM symposium on Parallel algorithms and architectures, pp. 298-309, Aug. 1, 1994.

Chiang et al., "Toward supporting data parallel programming on clusters of symmetric multiprocessors", Proceedings International Conference on Parallel and Distributed Systems, pp. 607-614, Dec. 14, 1998.

Danalis et al., "PTG: an abstraction for unhindered parallelism", 2014 Fourth International Workshop on Domain-Specific Languages and High-Level Frameworks for High Performance Computing, pp. 1-10, Nov. 17, 2014.

Cosnard et al., "Symbolic Scheduling of Parameterized Task Graphs on Parallel Machines," Combinatorial Optimization book series (COOP, vol. 7), pp. 217-243, year 2000.

Jeannot et al., "Automatic Multithreaded Parallel Program Generation for Message Passing Multiprocessors using paramerized Task Graphs", World Scientific, pp. 1-8, Jul. 23, 2001.

Stone, "An Efficient Parallel Algorithm for the Solution of a Tridiagonal Linear System of Equations," Journal of the Association for Computing Machinery, vol. 10, No. 1, pp. 27-38, Jan. 1973.

Kogge et al., "A Parallel Algorithm for the Efficient Solution of a General Class of Recurrence Equations," IEEE Transactions on Computers, vol. C-22, No. 8, pp. 786-793, Aug. 1973.

Hoefler et al., "Message Progression in Parallel Computing—To Thread or not to Thread?", 2008 IEEE International Conference on Cluster Computing, pp. 1-10, Tsukuba, Japan, Sep. 29-Oct. 1, 2008.

Wikipedia, "Loop unrolling," pp. 1-9, last edited Sep. 9, 2020 downloaded from https://en.wikipedia.org/wiki/Loop_unrolling.

Chapman et al., "Introducing OpenSHMEM: SHMEM for the PGAS Community," Proceedings of the Forth Conferene on Partitioned Global Address Space Programming Model, pp. 1-4, Oct. 2010.

IEEE Standard 1588-2008, "IEEE Standard for a Precision Clock Synchronization Protocol for Networked Measurement and Control Systems", pp. 1-289, year 2008.

Weibel et al., "Implementation and Performance of Time Stamping Techniques", 2004 Conference on IEEE 1588, bages 1-29, Sep. 28, 2004.

InfiniBandTM Architecture Specification vol. 1, Release 1.2.1,pp. 1-1727, Nov. 2007.

Lu et al., "A Fast CRC Update Implementation", Computer Engineering Laboratory, Electrical Engineering Department, pp. 113-120, Oct. 8, 2003.

Mellette et al., "Toward Optical Switching in the Data Center", IEEE 19th International Conference on High Performance Switching and Routing (HPSR), pp. 1-6, Bucharest, Romania, Jun. 18-20, 2018.

Bakopoulos et al., "NEPHELE: an end-to-end scalable and dynamically reconfigurable optical architecture for application-aware SDN cloud datacenters", IEEE Communications Magazine, vol. 56, issue 2, pp. 1-26, Feb. 2018.

O-RAN Alliance, "O-RAN Fronthaul Working Group; Control, User and Synchronization Plane Specification", ORAN-WG4.CUS. 0-v01.00, Technical Specification, pp. 1-189, year 2019.

Vattikonda et al., "Practical TDMA for Datacenter Ethernet", EuroSys conference, Bern, Switzerland, pp. 225-238, Apr. 10-13, 2012.

Ericsson AB et al., "Common Public Radio Interface: eCPRI Interface Specification", V2.0, pp. 1-109, May 10, 2019.

Xilinx Inc., "Radio over Ethernet Framer v2.1", PB056 (v2.1), pp. 1-9, Oct. 30, 2019.

Weibel, H., "High Precision Clock Synchronization according to IEEE 1588 Implementation and Performance Issues", Zurich University of Applied Sciences, pp. 1-9, Jan. 17, 2005.

Sanchez-Palencia, J., "[RFC,v3,net-next,00/18] Time based packet transmission", pp. 1-14, Mar. 7, 2018.

IEEE Std 802.1Qaz™, "IEEE Standard for Local and metropolitan area networks—Media Access Control (MAC) Bridges and Virtual Bridged Local Area Networks—Amendment 18: Enhanced Transmission Selection for Bandwidth Sharing Between Traffic Classes", IEEE Computer Society, pp. 1-110, Sep. 30, 2011.

Crupnicoff et al., "Deploying Quality of Service and Congestion Control in InfiniBand-based Data Center Networks" White Paper, Mellanox Technologies Inc, Rev 1.0, pp. 1-19, Oct. 15, 2005.

Mathey et al., "Scalable Deadlock-Free Deterministic Minimal-Path Routing Engine for InfiniBand-Based Dragonfly Networks", IEEE Transactions on Parallel and Distributed Systems, vol. 29, No. 1, pp. 183-197, Jan. 2018.

Wikipedia, Precision Time Protocol, pp. 1-9, Apr. 20, 2020.

SMPTE Standard, "Professional Media Over Managed IP Networks:Traffic Shaping and Delivery Timing for Video", The Society of Motion Picture and Television Engineers, pp. 1-17, Nov. 22, 2017.

Wikipedia, "Time-Sensitive Networking", pp. 1-12, Mar. 5, 2020.

Wikipedia, "Memory Protection," pp. 1-6, last edited May 23, 2021.

Mills, "Network Time Protocol (NTP)," RFC 0958, pp. 2-15, Sep. 1985.

Mills, "Network Time Protocol (Version 1): Specification and Implementation," RFC 1059, pp. 2-59, Jul. 1988.

Mills, "Internet Time Synchronization: The Network Time Protocol," IEEE Transactions on Communication, vol. 39, No. 10, pp. 1482-1493, Oct. 1991.

Mills, "Network Time Protocol (Version 3): Specification, Implementation and Analysis," RFC 1305, pp. 1-96, Mar. 1992.

Graham, U.S. Appl. No. 18/074,563, filed Dec. 5, 2022.

EP Application #22193554.6 Search Report dated Dec. 20, 2022.

Nudelman et al., U.S. Appl. No. 18/071,692, filed Nov. 30, 2022.

Xu et al., "SLOAVx: Scalable LOgarithmic AlltoallV Algorithm for Hierarchical Multicore Systems", 13th IEEE/ACM International Symposium on Cluster, Cloud, and Grid Computing, pp. 369-376, year 2013.

Graham, U.S. Appl. No. 63/356,923, filed Jun. 29, 2022.

U.S. Appl. No. 17/495,824 Office Action dated Jan. 27, 2023.

Yang et al., "SwitchAgg: A Further Step Toward In-Network Computing," 2019 IEEE International Conference on Parallel & Distributed Processing with Applications, Big Data & Cloud Computing, Sustainable Computing & Communications, Social Computing & Networking, pp. 36-45, Dec. 2019.

Pacheco, "A User's Guide to MPI," Department of Mathematics, University of San Francisco, CA, USA, pp. 1-51, Mar. 30, 1998.

Wikipedia, "Message Passing Interface," pp. 1-16, last edited Nov. 7, 2021, as downloaded from https://en.wikipedia.org/wiki/Message_Passing_Interface.

(56) References Cited

OTHER PUBLICATIONS

"Message Passing Interface (MPI): History and Evolution," Virtual Workshop, Cornell University Center for Advanced Computing, NY, USA, pp. 1-2, year 2021, as downloaded from https://cvw.cac.cornell.edu/mpi/history.
EP Application # 20156490.3 Office Action dated Sep. 27, 2023.
U.S. Appl. No. 17/495,824 Office Action dated Aug. 7, 2023.
U.S. Appl. No. 17/335,122 Office Action dated Jul. 28, 2023.
U.S. Appl. No. 18/071,692 Office Action dated Sep. 27, 2023.

* cited by examiner

SINGLE-STEP COLLECTIVE OPERATIONS

CROSS-REFERENCE TO RELATED APPLICATION

This application claims the benefit of U.S. Provisional Patent Application 63/405,505, filed Sep. 12, 2022, which is incorporated herein by reference.

FIELD

The present invention relates generally to high-performance computing (HPC), and particularly to communication among collaborating software processes using collective operations.

BACKGROUND

Collective communications are used by groups of computing nodes to exchange data in connection with a distributed processing application. In HPC, for example, the nodes are typically software processes running in parallel, for example on different computing cores. The nodes exchange collective communications with one another in connection with parallel program tasks carried out by the processes. The term "collective operation" is used in the present description and in the claims to refer to functions performed concurrently by multiple processes (and possibly all the processes) participating in a parallel processing task. These collective operations typically include communication functions, in which the processes in the group concurrently transmit and receive data to and from other processes in the group via a communication medium. These functions are referred to as "collective communications." The collective communications among processes may be exchanged over any suitable communication medium, such as over a physical network, for example a high-speed switch fabric or packet network, or via shared memory within a computer.

Various protocols have been developed to support collective communications. One of the best-known protocols is the Message Passing Interface (MPI), which enables processes to move data from their own address spaces to the address spaces of other processes through cooperative operations carried out by each process in a process group. In MPI parlance, the process group is referred to as a "communicator," and each member process is identified as a "rank." MPI collective operations include all-to-all, all-to-all-v, and all-to-all-w operations, which gather and scatter data from all ranks to all other ranks in a communicator. In the operation all-to-all, each process in the communicator sends a fixed-size message to each of the other processes. The operations all-to-all-v and all-to-all-w are similar to the operation all-to-all, but the messages may differ in size. In all-to-all-w, the messages may also contain different data types.

In naïve implementations of all-to-all-v and all-to-all-w, each member process transmits messages to all other member processes in the group. In large-scale HPC distributed applications, the group can include thousands of processes running on respective processing cores, meaning that millions of messages are exchanged following each processing stage. To reduce the communication burden associated with this message exchange, message aggregation protocols have been proposed.

For example, U.S. Pat. No. 10,521,283 describes in-node aggregation of MPI all-to-all and all-to-all-v collectives. An MPI collective operation is carried out in a fabric of network elements by transmitting MPI messages from all the initiator processes in an initiator node to designated responder processes in respective responder nodes. Respective payloads of the MPI messages are combined in a network interface device of the initiator node to form an aggregated MPI message. The aggregated MPI message is transmitted through the fabric to network interface devices of responder nodes, which disaggregate the aggregated MPI message into individual messages and distribute the individual messages to the designated responder node processes.

SUMMARY

Embodiments of the present invention that are described hereinbelow provide efficient methods for collective communications, as well as systems and software implementing such methods.

There is therefore provided, in accordance with an embodiment of the invention, a method for collective communications, which includes invoking a collective operation over a group of computing processes in which the processes in the group concurrently transmit and receive data to and from other processes in the group via a communication medium. Messages are composed for transmission by source processes in the group, including metadata indicating how the data to be transmitted by the source processes in the collective operation are to be handled by destination processes that are to receive the data and also including in at least some of the messages the data to be transmitted by one or more of the source processes to one or more of the destination processes. The composed messages are transmitted concurrently from the source processes to the destination processes in the group over the communication medium. The data are processed by the destination processes in response to the metadata included in the messages received by the destination processes.

In a disclosed embodiment, composing the messages includes incorporating the data together with the metadata in the messages when a size of the data for transmission from a given source process to a given destination process is less than a predefined threshold, and transmitting only the metadata without the data when the size of the data for transmission from the given source process to the given destination process is greater than the predefined threshold, whereby the destination process retrieves the data from the source process using the metadata in the messages.

Additionally or alternatively, transmitting the composed messages includes, for at least some of the messages, transmitting the messages having respective sizes that are greater than a predefined threshold to the destination processes without aggregation, and aggregating the messages for which the respective sizes are less than the predefined threshold and transmitting the aggregated messages to the destination processes.

In some embodiments, processing the data includes transmitting, responsively to the metadata in a message received by a destination process, a request from the destination process to the source process to convey the data from the source process to the destination process, whereby the source process transmits the data to the destination process responsively to the request. In a disclosed embodiment, transmitting the request includes transmitting a remote direct memory access (RDMA) read request from the destination process to the source process.

In some embodiments, invoking the collective operation includes initiating an all-to-all-v, all-to-all-w, all-gather-v, gather-v, or scatter-v operation.

There is also provided, in accordance with an embodiment of the invention, a system for collective communications, including multiple processors, which are interconnected by a communication medium and are programmed to run respective computing processes. Upon receiving an invocation of a collective operation over a group of the processes in which the processes in the group are to concurrently transmit and receive data to and from other processes in the group via a communication medium, the processors compose, for transmission by source processes in the group, messages including metadata indicating how the data to be transmitted by the source processes in the collective operation are to be handled by destination processes that are to receive the data and also including in at least some of the messages the data to be transmitted by one or more of the source processes to one or more of the destination processes. The processors transmit the composed messages concurrently from the source processes to the destination processes in the group over the communication medium. The processors process the data in the destination processes in response to the metadata included in the messages received by the destination processes.

There is additionally provided, in accordance with an embodiment of the invention, a computer software product for collective communications among a group of computing processes running on processors, which are interconnected by a communication medium. The product includes a tangible, non-transitory computer-readable medium in which program instructions are stored, which instructions cause the processors, upon receiving an invocation of a collective operation over a group of the processes in which the processes in the group are to concurrently transmit and receive data to and from other processes in the group via a communication medium, to compose, for transmission by source processes in the group, messages including metadata indicating how the data to be transmitted by the source processes in the collective operation are to be handled by destination processes that are to receive the data and also including in at least some of the messages the data to be transmitted by one or more of the source processes to one or more of the destination processes. The instructions cause the processors to transmit the composed messages concurrently from the source processes to the destination processes in the group over the communication medium, and to process the data in the destination processes in response to the metadata included in the messages received by the destination processes.

The present invention will be more fully understood from the following detailed description of the embodiments thereof, taken together with the drawings in which:

DETAILED DESCRIPTION

Overview

Figure 1:
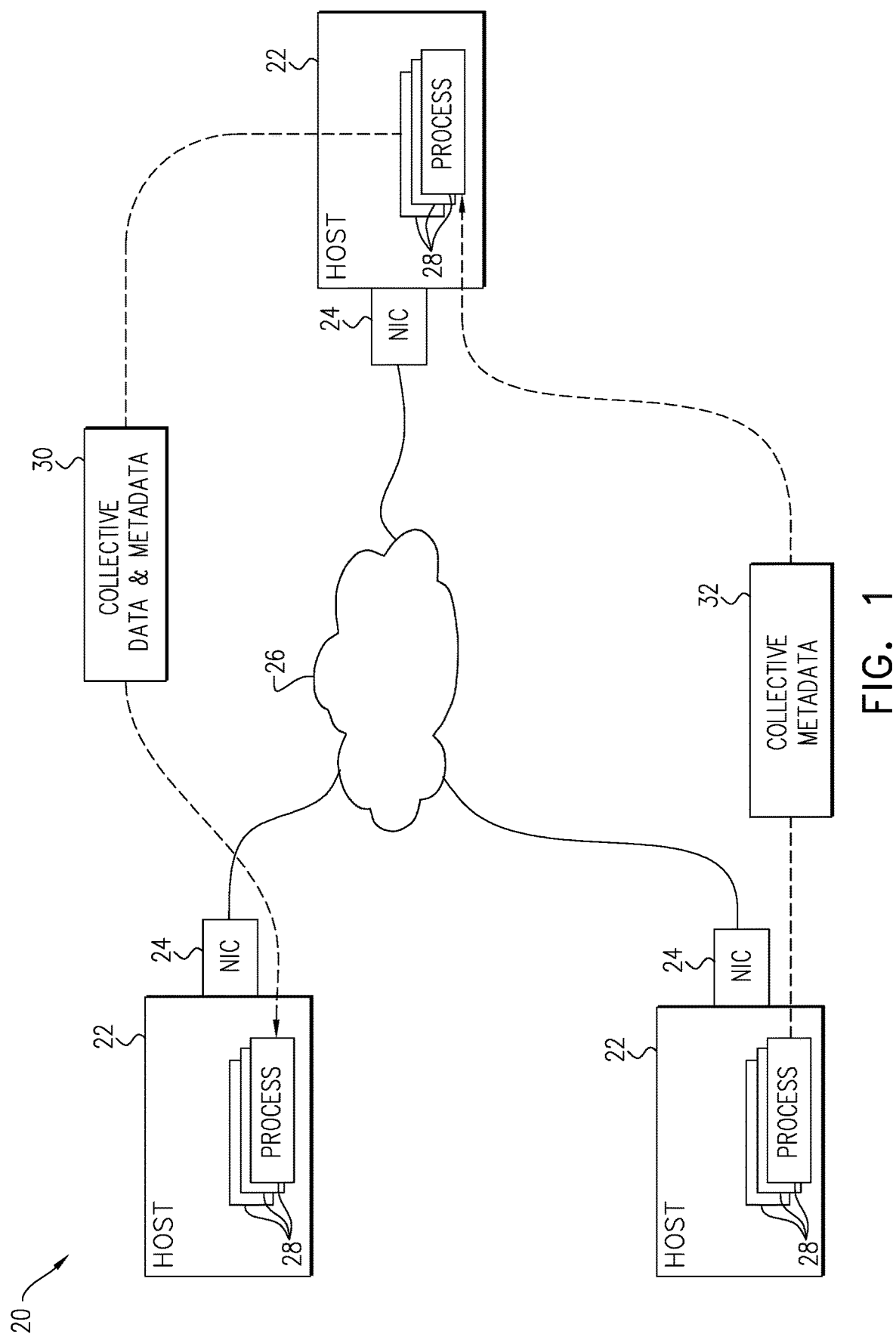
FIG. 1 is a block diagram that schematically illustrates collective communications in a computer system, in accordance with an embodiment of the invention.

In collective communications, destination processes do not necessarily have information about the messages that they are to receive from source processes until the messages actually arrive. In all-to-all-v operations, for example, the processes in a group may not have any advance indication of their own as to which source processes are going to send them data in a given operation or how much data a given source process is going to send. This uncertainty can lead to bottlenecks and inefficiencies in handling the data at the destination processes.

In some applications, this uncertainty is alleviated by performing two collective operations in each round of communications: In the first operation, the processes exchange metadata to inform the destination processes how much data to expect, of what type, and from which source processes. This first operation can be carried out using all-to-all operation, for example. In the second operation, such as an all-to-all-v operation, the processes exchange the actual data. This two-stage model makes the programmer's job easier, but at the cost of increased communication load and latency.

Embodiments of the present invention that are described herein address the shortcomings of these existing models by enabling the processes in a group to exchange both metadata and data in a single collective operation. When a collective operation is invoked over the group of computing processes, the source processes in the group identify the data that they are going to transmit to respective destination processes, along with metadata indicating how the data are to be handled by each destination process. The source processes compose messages containing the metadata for transmission to the respective destination processes. Some of the messages may comprise only metadata, for example messages to destination nodes for which the source node has a large volume of data to transmit. Such messages enable the destination process to prepare an application buffer to receive the data before the actual transmission of the data. Other messages, however, comprise the actual data to be transmitted to a given destination processes, together with the metadata.

The source processes concurrently transmit these messages (including messages containing only metadata and messages containing both metadata and data) to the destination processes in the group over a communication medium. Upon receiving the messages, the destination processes use the metadata comprised in the messages that they have received in processing the data.

Some embodiments are directed particularly to implementing collective operations in which message sizes are not known in advance, such as all-to-all-v, all-to-all-w, all-gather-v, gather-v, and scatter-v. In such operations, the source process will incorporate the data together with the metadata in a given message when the size of the data for transmission from the source process to a given destination process is less than a predefined threshold. On the other hand, when the size of the data for transmission from the source process to a given destination process is greater than the predefined threshold, the source process will transmit only the metadata without the data in the message that it sends in the collective operation. The destination process will then use the metadata that it received in the message in retrieving the data from the source process in an additional step following the collective message exchange. For example, the destination process may use the metadata in transmitting a request to the source process, such as a remote direct memory access (RDMA) read request, to transmit the data to the destination process.

In some embodiments, message aggregation is used to enhance communication efficiency in handling small messages. In these embodiments, messages having respective sizes that are greater than a predefined threshold are transmitted from the source processes to the destination processes directly, without aggregation. Messages smaller than the predefined threshold, however, are aggregated by the source processes before transmission of the aggregated messages to the destination processes. Various aggregation algorithms may be used for this purpose. In one embodiment, a multi-step aggregation algorithm is used, in which data blocks are scattered and gathered among different processes at each step. Most data blocks that are aggregated are transmitted multiple times, through some are sent only once, Although the present embodiments are described specifically with reference to the all-to-all-v operations, the principles of these embodiments may similarly be applied in accelerating other collective operations in which message sizes are not known in advance, as noted above. Furthermore, although these embodiments are framed in terms of MPI operations and protocols, the principles of the present invention may alternatively be implemented, mutatis mutandis, in conjunction with other protocols. All such alternative implementations are considered to be within the scope of the present invention.

System Description

FIG. 1 is a block diagram that schematically illustrates collective communications in a computer system 20, in accordance with an embodiment of the invention. System 20 in this example comprises multiple processors, in the form of host computers 22, each comprising a central processing unit (CPU), memory, and other components as are known in the art. Each host computer 22 is connected by a respective network interface controller (NIC) 24 to a network 26, such as a high-speed switch fabric or other packet communication network. Although for the sake of simplicity only three host computers are shown in FIG. 1, in practice system 20 may comprise hundreds or thousands of host computers, interconnected by network 26. Host computers 22 in system 20 run a distributed HPC software application, in which multiple processes 28 run in parallel on different host computers. Typically (although not necessarily), each host computer 22 comprises multiple CPU cores, and each process 28 is assigned to run on a respective core.

Following certain computational stages in the distributed application, the program instructions invoke a collective operation, such as an all-to-all-v operation. In the context of this collective operation, system 20 defines an MPI communicator including all the participating processes 28, and each process has a respective rank within the communicator. In response to these instructions, each process 28 prepares data for transmission to all the other processes (ranks) within system 20, as well as metadata indicating how the data to be transmitted by the source processes in the collective operation are to be handled by destination processes that are to receive the data.

When the size of the data for transmission to a given destination is less than a certain threshold data size, the source process incorporates the data in a message 30 containing both the data and the metadata for transmission to the destination process. Messages 30 that are smaller than a predefined message aggregation threshold are aggregated and transmitted together to the respective destinations, typically via one or more intermediate destinations. This message aggregation can be carried out, for example, using techniques described in U.S. patent application Ser. No. 18/074,563, filed Dec. 5, 2022, whose disclosure is incorporated herein by reference. Alternatively or additionally, the message aggregation may take advantage of capabilities of NICs 24 in supporting collective operations, for example as described in the above-mentioned U.S. Pat. No. 10,521,283.

On the other hand, when the size of the data for transmission to a given destination process is greater than the threshold data size, the source process transmits a message 32 containing only the metadata to the respective destination process. The destination process uses the metadata in preparing a buffer in local memory to receive the data and in sending a request to the source process to transmit the data. Alternatively, message 32 may also contain a part of the data, in addition to the metadata.

Host computers 22 carry out the collective operations that are described herein, including particularly the present methods of selective data transmission and aggregation, under the control of software instructions. The software for these purposes may be downloaded to the host computers in electronic form, for example over network 26. Additionally or alternatively, the software may be stored on tangible, non-transitory computer-readable media, such as optical, magnetic, or electronic memory media.

Methods for Transmitting Data and Metadata

Figure 2:
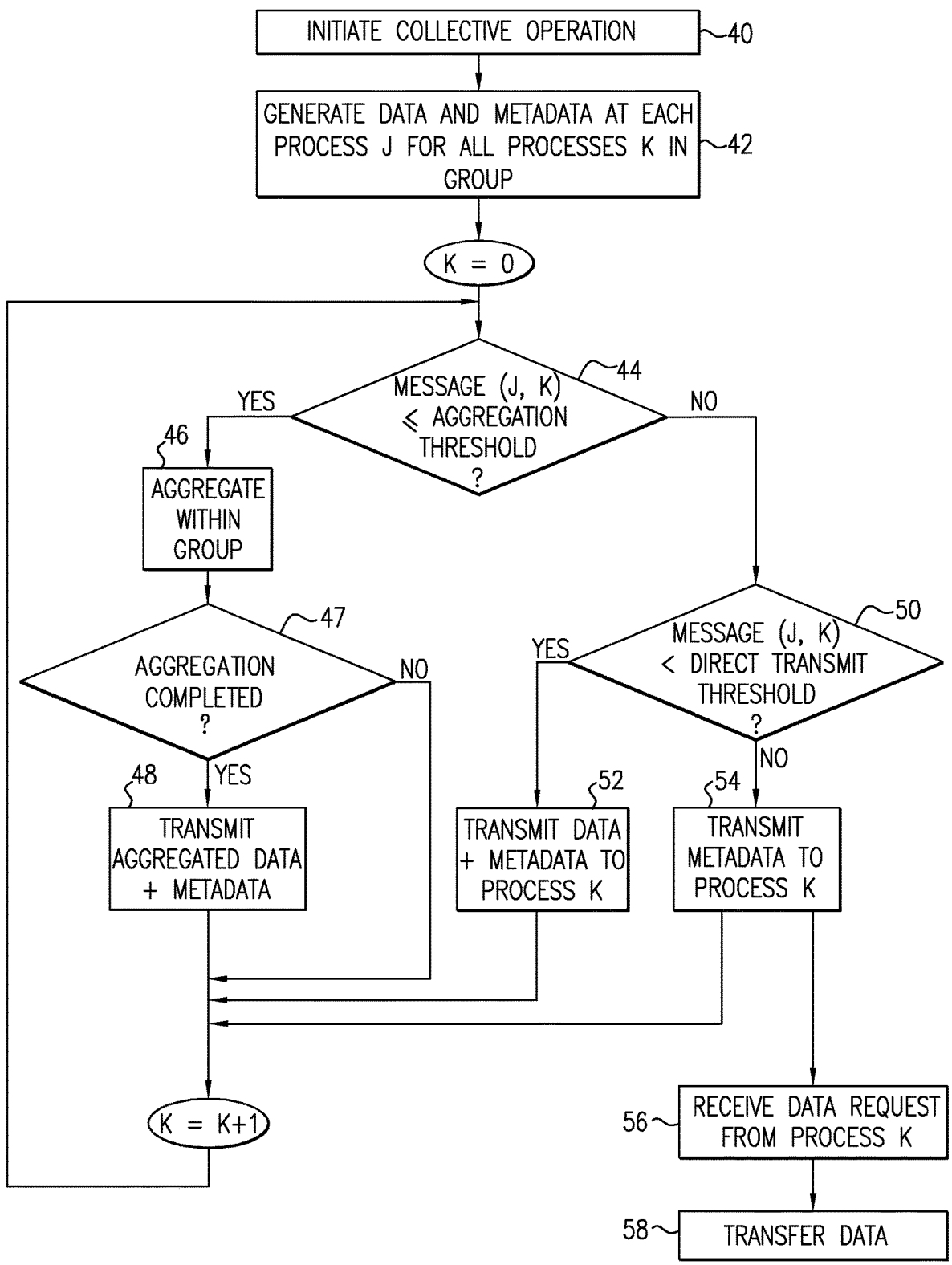
FIG. 2 is a flow chart that schematically illustrates a method for collective communications, in accordance with an embodiment of the invention.

FIG. 2 is a flow chart that schematically illustrates a method for collective communications, in accordance with an embodiment of the invention. This method is carried out by a group of processes, such as processes 28 in system 20 (FIG. 1), when a collective operation is invoked over the group, at a collective initiation step 40.

In response to invocation of the collective operation, each of at least some of the processes in the group generates data for transmission to some or all of the other processes, at a data generation step 42. Typically, in any given collective operation, each process 28 can be both a source process for transmission of data and a destination process for receiving data. (When messages are aggregated, the destination processes also serve as intermediate destinations, which receive data in transit for aggregation and forwarding.) At step 42, the source processes also generate metadata that indicate how the data to be transmitted by the source processes in the collective operation are to be handled by the respective destination processes upon receiving the data. The metadata typically indicate the data size and may also provide information about the data type and/or the location of the data in a source buffer. In FIG. 2, the source processes are indicated by the index J, while the destination processes are indicated by the index K, so that the message to be sent from a given source process to a given destination process is identified as MESSAGE(J,K).

Each source process J evaluates the size of each of the messages (J,K) that the source process has prepared, at an aggregation evaluation step 44. The size in this case refers to the combined size of the respective metadata and data that are to be transmitted to each destination process K. If this size is less than a predefined aggregation threshold, for example less than 500 bytes, the source process will not transmit the message directly to the destination process but will rather aggregate the message with messages from other source processes that are directed to the same destination process, at an aggregation step 46. Any suitable message aggregation algorithm may be used for this purpose, such as the algorithms described in the above-mentioned U.S. patent application Ser. No. 18/074,563. Depending on the type and radix of the aggregation algorithm, the aggregating processes determine when aggregation of a given set of messages is complete, at an aggregation completion step 47. The aggregated messages, including data and metadata, are then transmitted to the destination processes, at an aggregated transmission step 48.

When the message (J,K) is larger than the aggregation threshold, the source process assesses whether the size of the data to be transmitted to destination process K is larger than a direct data transmission threshold, at a data evaluation step 50. If the data size is less than this threshold, the source process frames the data and metadata together in a single message and transmits the message to the destination process as part of the collective operation, at a combined transmission step 52.

When the size of the data destined for a given process K is found at step 50 to be larger than the direct data transmission threshold, the source process transmits only the metadata to process K as part of the collective operation, at a metadata transmission step 54. The source process then goes on to process the data for transmission to the next destination process K+1. After receiving the message sent at step 54, process K extracts the metadata from the message and uses the metadata in composing and transmitting a data request to the source process J, at a data request step 56. Upon receiving this request, the source process transmits the appropriate data to destination process K, at a data transmission step 58.

Figure 3:
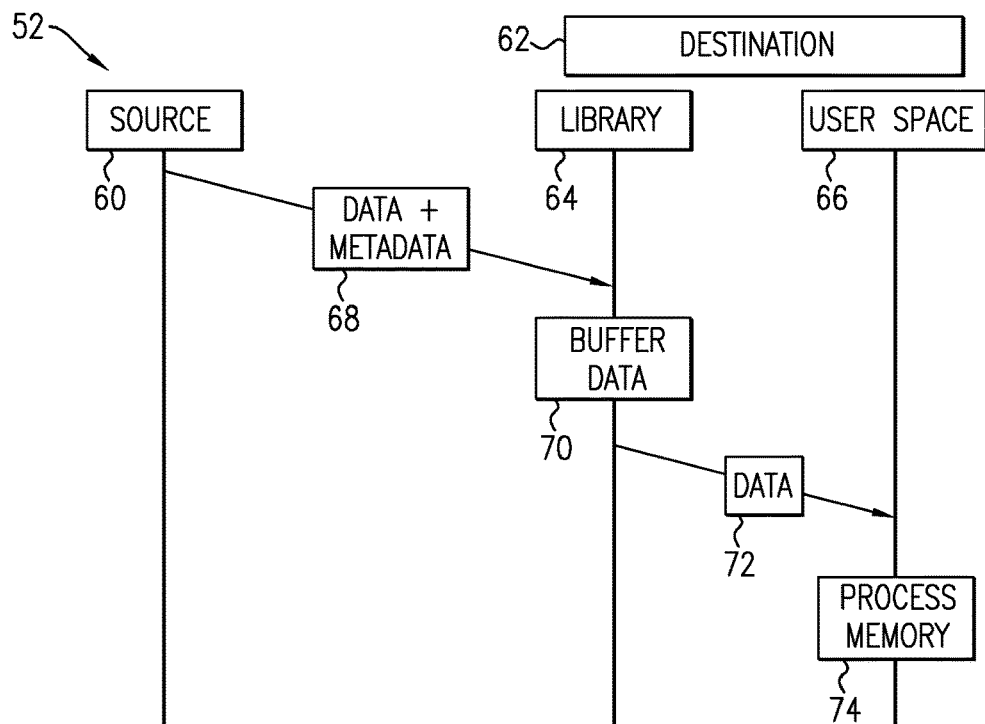
FIGS. 3 and 4 are ladder diagrams that schematically illustrate collective communication exchanges between source and destination processes, in accordance with embodiments of the invention.

FIG. 3 is a ladder diagram that schematically shows details of an implementation of combined transmission step 52 (FIG. 2) in transferring data and metadata between a source 60 and a destination 62, in accordance with an embodiment of the invention. This diagram illustrates how messages containing both data and metadata are handled at destination 62. This implementation uses a library 64 of input/output and memory handling routines in receiving incoming messages and in transferring the data from the messages to a user space 66 where the destination process can access the data.

Source 60 transmits a combined message 68 containing data and metadata to destination 62. A routine in library 64 extracts the metadata from message 68, allocates a memory buffer 70 based on the metadata, and saves the incoming data in the buffer. Library 64 transfers data 72 from buffer 70 to a process memory 74 in user space 66, for input to the destination process, along with the data received from other source processes.

Figure 4:
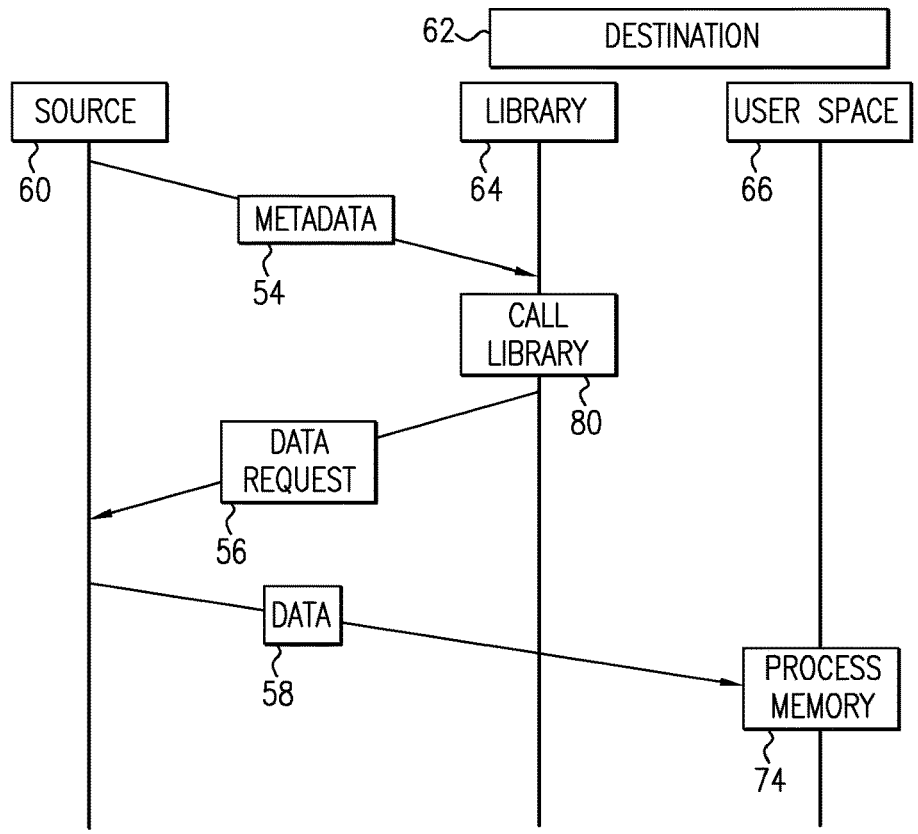

FIG. 4 is a ladder diagram that schematically shows details of an implementation of steps 54, 56, and 58 (FIG. 2), in conveying data from source 60 to destination 62, in accordance with another embodiment of the invention. This diagram illustrates how a data transfer is carried out when the size of the data is too large to be transmitted together with the metadata in the collective operation.

At step 54, source 60 transmits a message to destination 62 containing the metadata with respect to the data to be transferred. Destination 62 calls a library routine 80 to handle the data transfer based on the metadata. The library routine allocates a buffer in process memory 74 and transmits a data request to source 60 at step 56. For example, the data request may comprise an RDMA read request sent by NIC 24 (FIG. 1) of the destination computer and directed to an address in the memory of source 60 that was indicated by the metadata received by library 64 at step 54. NIC 24 of source 60 reads the data from the source memory and transmits an RDMA read response containing the data to destination 62 at step 58. Upon receiving the RDMA read response, the NIC of destination 62 will write the data directly to the designated buffer in process memory 74.

Alternatively, destination 62 may use other protocols to request transfer of the data from source 60. For example, destination 62 may send a message to source 60 at step 56 indicating the address of the designated buffer in process memory 74, and requesting data transfer to this buffer. NIC 24 of source 60 can then direct an RDMA write request containing the data to the designated buffer. Other implementations will be apparent to those skilled in the art after reading the above description and are considered to be within the scope of the present invention.

It will thus be appreciated that the embodiments described above are cited by way of example, and the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for collective communications, comprising:
invoking a collective operation over a group of computing processes in which the processes in the group concurrently transmit and receive data to and from other processes in the group via a communication medium;
composing, for transmission by source processes in the group, messages comprising metadata indicating how the data to be transmitted by the source processes in the collective operation are to be handled by destination processes that are to receive the data and also comprising in at least some of the messages the data to be transmitted by one or more of the source processes to one or more of the destination processes,
such that when a size of the data for transmission from a given source process to a given destination process is less than a predefined threshold, the data is incorporated together with the metadata in a message from the given source process to the given destination process, and when the size of the data for transmission from the given source process to the given destination process is greater than the predefined threshold, the message contains only the metadata without the data;
transmitting the composed messages concurrently from the source processes to the destination processes in the group over the communication medium; and
processing the data by the destination processes in response to the metadata comprised in the messages received by the destination processes, wherein when a given message contains the metadata without the data, the destination process retrieves the data from the source process using the metadata in the given message.

2. The method according to claim 1, wherein transmitting the composed messages comprises, for at least some of the messages:
transmitting the messages having respective sizes that are greater than a predefined threshold to the destination processes without aggregation; and
aggregating the messages for which the respective sizes are less than the predefined threshold and transmitting the aggregated messages to the destination processes.

3. The method according to claim 1, wherein processing the data comprises transmitting, responsively to the metadata in a message received by a destination process, a request from the destination process to the source process to convey the data from the source process to the destination process, whereby the source process transmits the data to the destination process responsively to the request.

4. The method according to claim 3, wherein transmitting the request comprises transmitting a remote direct memory access (RDMA) read request from the destination process to the source process.

5. The method according to claim 1, wherein invoking the collective operation comprises initiating an all-to-all-v, all-to-all-w, all-gather-v, gather-v, or scatter-v operation.

6. A system for collective communications, comprising multiple processors, which are interconnected by a communication medium and are programmed to run respective computing processes such that upon receiving an invocation of a collective operation over a group of the processes in which the processes in the group are to concurrently transmit and receive data to and from other processes in the group via a communication medium, the processors compose, for transmission by source processes in the group, messages comprising metadata indicating how the data to be transmitted by the source processes in the collective operation are to be handled by destination processes that are to receive the data and also comprising in at least some of the messages the data to be transmitted by one or more of the source processes to one or more of the destination processes, such that when a size of the data for transmission from a given source process to a given destination process is less than a predefined threshold, the data is incorporated together with the metadata in a message from the given source process to the given destination process, and when the size of the data for transmission from the given source process to the given destination process is greater than the predefined threshold, the message contains only the metadata without the data, and the processors transmit the composed messages concurrently from the source processes to the destination processes in the group over the communication medium, and process the data in the destination processes in response to the metadata comprised in the messages received by the destination processes, wherein when a given message contains the metadata without the data, the destination process retrieves the data from the source process using the metadata in the given message.

7. The system according to claim 6, wherein for at least some of the messages, the processors are to transmit the messages having respective sizes that are greater than a predefined threshold to the destination processes without aggregation, and the processors are to aggregate the messages for which the respective sizes are less than the predefined threshold and transmit the aggregated messages to the destination processes.

8. The system according to claim 6, wherein the processors are to transmit, responsively to the metadata in a message received by a destination process, a request from the destination process to the source process to convey the data from the source process to the destination process, whereby the source process transmits the data to the destination process responsively to the request.

9. The system according to claim 8, wherein the request comprises a remote direct memory access (RDMA) read request transmitted from the destination process to the source process.

10. The system according to claim 6, wherein the collective operation comprises an all-to-all-v, all-to-all-w, all-gather-v, gather-v, or scatter-v operation.

11. A computer software product for collective communications among a group of computing processes running on processors, which are interconnected by a communication medium, the product comprising a tangible, non-transitory computer-readable medium in which program instructions are stored, which instructions cause the processors, upon receiving an invocation of a collective operation over a group of the processes in which the processes in the group are to concurrently transmit and receive data to and from other processes in the group via a communication medium:

to compose, for transmission by source processes in the group, messages comprising metadata indicating how the data to be transmitted by the source processes in the collective operation are to be handled by destination processes that are to receive the data and also comprising in at least some of the messages the data to be transmitted by one or more of the source processes to one or more of the destination processes, such that when a size of the data for transmission from a given source process to a given destination process is less than a predefined threshold, the data is incorporated together with the metadata in a message from the given source process to the given destination process, and when the size of the data for transmission from the given source process to the given destination process is greater than the predefined threshold, the message contains only the metadata without the data, and to transmit the composed messages concurrently from the source processes to the destination processes in the group over the communication medium, and to process the data in the destination processes in response to the metadata comprised in the messages received by the destination processes, wherein when a given message contains the metadata without the data, the destination process retrieves the data from the source process using the metadata in the given message.

12. The product according to claim 11, wherein for at least some of the messages, the instructions cause the processors to transmit the messages having respective sizes that are greater than a predefined threshold to the destination processes without aggregation, and to aggregate the messages for which the respective sizes are less than the predefined threshold and transmit the aggregated messages to the destination processes.

13. The product according to claim 11, wherein the instructions cause the processors to transmit, responsively to the metadata in a message received by a destination process, a request from the destination process to the source process to convey the data from the source process to the destination process, whereby the source process transmits the data to the destination process responsively to the request.

14. The product according to claim 13, wherein the request comprises a remote direct memory access (RDMA) read request transmitted from the destination process to the source process.

15. The product according to claim 11, wherein the collective operation comprises an all-to-all-v, all-to-all-w, all-gather-v, gather-v, or scatter-v operation.

* * * * *